June 5, 1962  D. R. TREFFEISEN  3,037,725
STALL PREVENTION SYSTEM FOR NAVIGABLE CRAFT
Filed Feb. 5, 1960
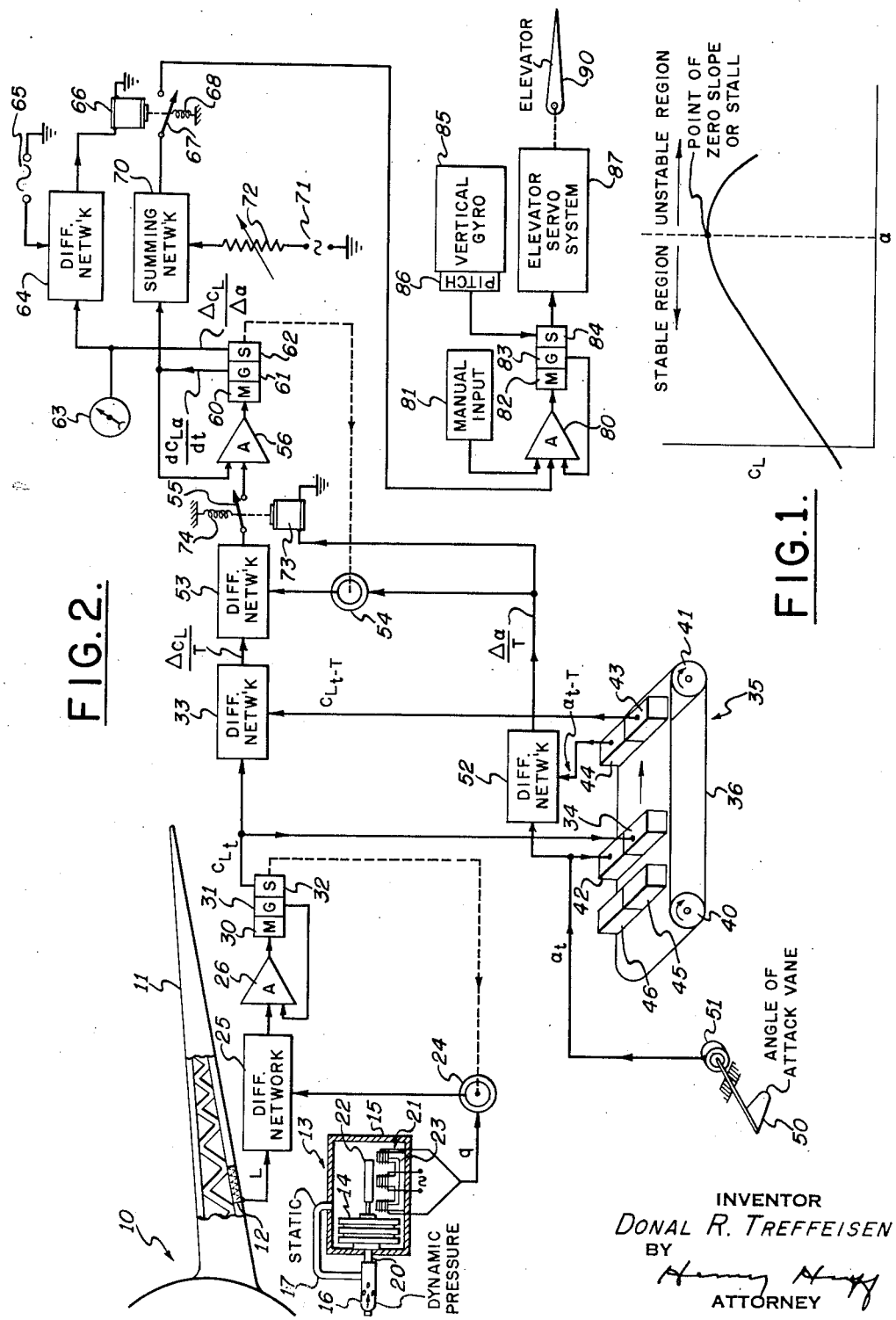
INVENTOR
DONAL R. TREFFEISEN
BY
ATTORNEY

United States Patent Office 3,037,725
Patented June 5, 1962

3,037,725
STALL PREVENTION SYSTEM FOR NAVIGABLE CRAFT
Donal R. Treffeisen, Huntington Station, N.Y., assignor to Sperry Rand Corporation, Great Neck, N.Y., a corporation of Delaware
Filed Feb. 5, 1960, Ser. No. 7,028
13 Claims. (Cl. 244—77)

This invention relates to automatic stall prevention apparatus for navigable craft, for example, aircraft.

In flight, an airplane has a certain lifting force which is related to the angle that its airfoil makes with the incident wind stream. As long as an increase in this angle causes an increase in lift, the airplane is under control. If an increase in this angle causes either no increase or a decrease in the lift, control of the airplane is lost. The purpose of the present invention is to provide an indication when the unstable region is being approached and to warn the pilot and/or control the action of the aircraft flight control mechanism to maintain the craft within the stable control region.

The lift that a plane experiences is proportional to the coefficient of lift, $C_L$, while the angle that the airfoil makes with the incident air stream is the angle of attack, $\alpha$. A typical curve relating the two quantities, $C_L$ with respect to $\alpha$, is shown in FIG. 1. Referring to the curve of FIG. 1, the region of positive slope is the stable operating region of the aircraft while the region of negative slope is an unstable region. The point of zero slope or stall separates the stable and unstable regions.

It will be noted that in the stable region as the curve approaches the point of zero slope or stall, the slope of the curve becomes more shallow. The present invention makes use of this phenomenon by obtaining a measure representative of the slope of the curve which is utilized to provide an indication of the impending stall condition and/or prevent stall when the aircraft approaches the unstable region.

The present invention is an improvement over the inventions disclosed in U.S. patent application 556,163, filed December 29, 1955, entitled Stall Prevention System for Aircraft in the names of Clement and Treffeisen, now U.S. Patent No. 2,953,327, and U.S. Patent 2,891,742, issued June 23, 1959, entitled Flight Control System for Aircraft in the names of Treffeisen et al. The system of the present invention provides numerous advantages over those of the prior art including (1) it provides a signal indicative of an impending stall condition that is valid in spite of changes in the gross weight, flap position or Mach number of the aircraft, (2) it produces corrective action that is always compatible with the command signal system of the aircraft, (3) it provides corrective action or a warning signal that adapts to the severity of the approach to the stall, and (4) it operates sequentially without manual reset.

It is a primary object of the present invention to provide a system for indicating and/or preventing the approach of a stall condition in an aircraft.

It is a further object of the present invention to provide a system which indicates and/or prevents the approach of stall condition of an aircraft by means of simple positive acting apparatus that is accurate over the wide range of flight conditions experienced by modern aircraft.

The above objects are achieved by a preferred embodiment of the invention which detects the lift, dynamic pressure and angle of attack of the aircraft and computes the slope of the coefficient of lift versus angle of attack curve to provide a signal representative of the change of coefficient of lift with respect to the change of angle of attack over a predetermined time interval. This signal is utilized to provide an indication of an impending stall condition while the time rate of change of this signal controls the aircraft flight control mechanism to prevent a stall.

Referring to the drawings:

FIG. 1 is a typical curve of the coefficient of lift with respect to the angle of attack of an aircraft; and FIG. 2 is a preferred embodiment of an aircraft stall indication and prevention system utilizing the present invention.

The invention will now be described by referring to FIG. 2 which discloses an automatic stall indication and prevention system for a typical aircraft 10. The lift produced by the wing 11 of the aircraft 10 is measured by a strain gauge 12 on the main spar of the wing 11. While the use of any suitable lift sensing means is within the scope of the invention, it is preferable to use for this purpose a strain gauge of the type employing a continuous solid filament of electrical conducting material bonded throughout its effective length to the surface of the strain-subject member so that its length and electrical resistance vary in response to the strain in the strained member. Strain gauges of this type have been described by A. C. Ruge in U.S. Patent No. 2,334,843. The electrical signal produced by the strain gauge 12 is representative of the lift produced by the wing 11 and has an amplitude proportional thereto. The strain gauge 12 may be connected as disclosed in U.S. Patent 2,553,546, issued May 22, 1951, to R. Brannin entitled Airplane Automatic Pilot.

A measure representative of the dynamic pressure experienced by the aircraft is obtained from a Pitot tube type dynamic pressure sensor 13 represented as a bellows 14 enclosed within a housing 15. The interior of the housing 15 is subjected to static pressure from the Pitot tube 16 by means of the static tube 17. The interior of the bellows is subjected to the dynamic or wind pressure by means of the conduit 20 which communicates with the interior of the bellows 14 at its fixed end. A pick-off device 21 is connected to the movable end of the bellows 14. The pick-off may be in the form of an E-transformer type pick-off having a movable armature 22 connected to the movable end of the bellows 14 with an E-shaped stator 23 mounted on a base that is fixed to the aircraft 10.

The primary winding or the central leg of the stator 23 is excited by an alternating current supply. The secondary windings on the two outer legs of the stator 23 are differentially connected and provide an output signal having an amplitude proportional to the dynamic pressure experienced by the aircraft 10. The secondary windings are connected to provide the excitation for the stator windings of a synchro 24.

The strain gauge 12 and the rotor of the synchro 24 are connected to a difference network 25 which has its output terminal connected to an input terminal of an amplifier 26. The output of the difference network 25 is applied by means of the amplifier 26 to drive a servomotor 30. The output shaft of the servomotor 30 is connected by gearing, not shown, to a tachometer generator 31 and to the rotor of a synchro 32 as well as to the rotor of the synchro 24. The output of the tachometer generator 31 is connected to an input terminal of the amplifier 26 to provide a rate feedback signal for stabilization purposes.

The lift, L, of an aircraft may be expressed as $$L = qC_L S$$

where $q$ is the dynamic wind pressure
$C_L$ is the coefficient of lift and
$S$ is the wing area Since the wing area remains constant, $$C_L \cong \frac{L}{q}$$

By means of the closed servo loop described above, the output of the synchro 32 is representative of the coefficient of lift since the output signal has an amplitude proportional to the lift, L, divided by the dynamic pressure, q. The output of the synchro 32 is representative of the instantaneous value of the coefficient of lift as indicated by the subscript t.

The output terminal of the synchro 32 is connected to one input terminal of a difference network 33 and to a write head 34 of a dynamic time delay device 35. The time delay device 35 may be a magnetic storage device having a continuous loop of recording tape 36 driven at a constant speed by conventional means (not shown) over spaced rollers 40 and 41. A pair of write heads 34 and 42 are disposed adjacent to each other proximate the magnetic tape 36 for magnetizing a portion of the tape 36 in accordance with the signals received by each of the heads. The device 35 further includes a pair of read heads 43 and 44 that are adjacent to each other proximate the tape 36 and cooperative with the write heads 34 and 42 respectively. The read heads 43 and 44 are spaced from the write heads 34 and 42 in order that the output signals from the read heads 43 and 44 have a predetermined time delay with respect to the input signals to the write heads 34 and 42 respectively. The device 35 also includes erase heads 45 and 46 disposed adjacent the write heads 34 and 42, respectively, and cooperate therewith for erasing the magnetization of the tape 36 each cycle.

An angle of attack sensor 50 is mounted on the aircraft 10 to provide an electrical signal from its associated synchro 51 representative of the instantaneous angle of attack of the aircraft, $\alpha_t$. The output terminal of the synchro 51 is connected to the write head 42 and to an input terminal of an amplifying difference network 52. The output of the read head 44 is representative of the angle of attack T seconds ago as indicated by the subscript, $\alpha_{t-T}$. The read head 44 is connected to the other input terminal of the difference network 52. Similarly, the output from the read head 43 is representative of the coefficient of lift T seconds ago as indicated by the subscript $C_{L_{t-T}}$ and it is connected to the other input terminal of the difference network 33. The time delay interval T is dependent upon the spacing of the write and read heads, and the linear speed of the magnetic tape 36.

The output of the difference network 33 is representative of the change of the coefficient of lift with respect to the time interval T and it is connected to an input terminal of a difference network 53. The output of the difference network 52 is representative of the change in the angle of attack with respect to the time interval T and this signal is applied as the excitation to a synchro 54. The output terminal of the synchro 54 is connected to the other input terminal of the difference network 53. The output of the difference network 53 is connected through a switch 55 to an input terminal of an amplifier 56. The output of the amplifier 56 drives a servomotor 60. The output shaft of the servomotor 60 is connected by gearing (not shown) to drive the armature of the tachometer generator 61, the rotor of a synchro 62 and also the rotor of the synchro 54. The output of the tachometer generator 61 is connected to an input terminal of the amplifier 56 to provide a rate feedback signal for stabilization purposes.

By means of the closed servo loop described immediately above, the output of the synchro 62 is a signal representative of the change of the coefficient of lift with respect to the change in the angle of attack, $$\frac{\Delta C_L}{\Delta \alpha}$$

while the output of the tachometer generator 61 is a signal representative of the time rate of change of the slope of the curve of the coefficient of lift with respect to the angle of attack $$\frac{dC_{L\alpha}}{dt}$$

These signals may be utilized in a number of ways for example, to provide an indication of an impending stall and/or to actuate apparatus to prevent the aircraft from experiencing a stall.

In the preferred embodiment shown, the output of the synchro 62 is connected to an indicator 63 to provide an indication of the change in coefficient of lift with respect to the change in angle of attack. The indicator 63 may be an A.C. voltmeter or other conventional indicating instrument. A pilot control stick shaker or a buzzer can be similarly connected to provide a tactile or an audible warning respectively of an approach to the stall.

In the preferred embodiment shown, the output of the synchro 62 is compared in a difference network 64 with a bias reference voltage from a voltage source 65 to provide an output representative of the difference therebetween. The network 64 is connected to a relay 66 having a spring biased switch 67. The switch 67 is normally held open as shown by means of a bias spring 68. Normally, the $$\frac{\Delta C_L}{\Delta \alpha}$$

signal will cancel the bias reference voltage and the relay 66 will be unenergized with the switch 67 open. When the $$\frac{\Delta C_L}{\Delta \alpha}$$

signal approaches zero, the bias reference voltage will be sufficient to energize the relay 66 thereby closing the switch 67 in a manner to be more fully explained.

To provide corrective control of the aircraft attitude depending upon the severity of the impending stall condition, the output of the tachometer generator 61 is connected to an input terminal of a summing network 70 which has its other input terminal connected to an alternating voltage source 71 through a variable resistor 72. The source 71 provides a corrective pitch rate command bias signal which is adjustable by means of the variable resistor 72. The output of the summing network 70 is connected through the switch 67 to an input terminal of a summing amplifier 80. The pitch rate command bias signal is of a polarity so as to always command a nose down pitch rate.

Manual flight control signals may be introduced by means of a manual input device 81 that is connected to provide an electrical signal representative of the desired manual command to another input terminal of the summing amplifier 80. The output of the amplifier 80 drives a servomotor 82 which has its output shaft connected by gearing (not shown) to drive the armature of a tachometer generator 83 and the rotor of a synchro 84. The output of the tachometer generator 83 is connected to another input terminal of the amplifier 80 to provide a rate feedback signal for stabilization purposes. The synchro 84 is excited by automatic command signals from an autopilot which is represented in the embodiment shown as a vertical gyro 85 having its pitch pick-off 86 connected to the stator windings of the synchro 84. The output winding of the synchro 84 is connected to an elevator servo system 87 which in turn is mechanically connected to position an elevator 90 of the aircraft 10.

Since there are conditions during normal operation of the aircraft wherein the change in coefficient of lift with respect to the change in the angle of attack is zero, for example, in straight and level flight, it is necessary to distinguish between this condition and an impending stall. In the preferred embodiment of the invention shown, this is accomplished by connecting the output of the difference network 52 to a relay 73 to control the position of the switch 55. When the change in angle of attack during the predetermined time interval is zero or below an extremely small predetermined value, the relay 73 is unenergized and the switch 55 is maintained in an open position by means of a biasing spring 74. When the amplitude of the signal from the network 52 exceeds the predetermined low value, the relay 73 is energized and the switch 55 is closed thereby connecting the output of the network 53 to the amplifier 56.

In the operation of the present invention, with the aircraft in straight and level flight, the change in angle of attack signal from the network 52 is zero and the relay 73 is unenergized. Thus, the switch 55 is open and effectively no signals are presented to the indicator 63, the difference network 64 or the summing network 70.

As the aircraft changes it angle of attack the amount of change is sensed by the angle of attack sensor 50 and the signal representative thereof from the synchro 51 is applied to the write head 42 and the difference network 52. The delayed version of this signal from the read head 44 is also applied to the difference network 52 and the output thereof, which is representative of the change of the angle of attack during the predetermined time interval, energizes the relay 73 to close the switch 55 assuming the signal from the network 52 is above a predetermined amplitude as explained above. The signal from the network 52 also excites the stator windings of the synchro 54.

The lift on the wing 11 is sensed by the strain gauge 12 and a signal representative thereof is applied to the difference network 25. The dynamic pressure experienced by the aircraft 10 is sensed by the dynamic pressure sensor 13 by means of its pick-off 21 and a signal representative thereof is applied to the stator windings of the synchro 24 which in turn applies the signal as modified by the position of its rotor to the network 25. The output of the network 25 is amplified in amplifier 26 and drives the motor 30 to provide a signal representative of the instantaneous value of the coefficient of lift at the output of synchro 32.

Signals representative of the instantaneous value of the coefficient of lift and the delayed version of the coefficient of lift, from the latter read head 43 of the time delay device 35, are applied to the difference network 33 which provides at its output a signal representative of the change of the coefficient of lift during the predetermined time interval established by the time delay device 35. With the switch 55 closed, the output of the difference network 53 is amplified in amplifier 56 and drives the motor 60 to provide a signal representative of the change in coefficient of lift with respect to the change in angle of attack, $$\frac{\Delta C_L}{\Delta \alpha}$$

at the output of synchro 62 and the time derivative of this signal $$\frac{dC_{L\alpha}}{dt}$$

from the output of the tachometer generator 61. The signal $$\frac{\Delta C_L}{\Delta \alpha} = C_{L\alpha}$$

i.e. the slope of the curve of lift coefficient $C_L$ versus angle of attack, thus $$\frac{d\left[\frac{\Delta C_L}{\Delta \alpha}\right]}{dt} = \frac{d(C_{L\alpha})}{dt}$$

An indication of the amplitude of the $$\frac{\Delta C_L}{\Delta \alpha}$$

signal is provided on the face of the indicator 63.

With the $$\frac{\Delta C_L}{\Delta \alpha}$$

signal within the stable region as described with respect to FIG. 1, this signal effectively cancels the reference voltage from source 65 by means of the difference network 64 and the relay 66 remains unenergized. In this condition, the switch 67 is open, as shown, and the output of the summing network 70 is prevented from being effective in controlling the elevator 90 since in the stable region this action is unnecessary.

As the aircraft approaches the stall condition and the $$\frac{\Delta C_L}{\Delta \alpha}$$

signal approaches zero, a point is reached where the reference voltage from the source 65 is sufficient to energize the relay 66 thereby closing the switch 67. This connects the corrective pitch rate command bias signal from the source 71 to the amplifier 80. The pitch rate bias signal from the source 71 commands a nose down pitch attitude at a predetermined rate with the reference angle for the pitch attitude provided by the pitch pick-off 86 of the vertical gyro 85.

By means of the summing network 70, the rate of change of $C_{L\alpha}$ signal from the generator 61 is added to the pitch rate signal from the source 71 to provide more positive corrective action in accordance with the severity of the approach to the stall condition. With the aircraft 10 approaching the stall condition slowly, the $$\frac{dC_{L\alpha}}{dt}$$

signal has a magnitude that is relatively low and hence the corrective pitch rate commanded by the sum of the signals from the generator 61 and the source 71 results in a gentle pitch down maneuver. However, when the approach to the stall condition is rapid, the $$\frac{dC_{L\alpha}}{dt}$$

signal has a large amplitude and the corrective signal applied to the amplifier 80 results in a rapid pitch down maneuver. The corrective action is therefore dependent upon the imminence of the dangerous situation.

When due to the pitch down maneuver the $$\frac{\Delta C_L}{\Delta \alpha}$$

signal again exceeds a predetermined amplitude, the relay 66 is deenergized, the corrective action ceases and the aircraft 10 is in a safe attitude within the stable region. The system action described above automatically repeats itself sequentially without the necessity of manual reset.

Although the preferred embodiment of the invention has been described utilizing particlar sensing means for obtaining signals representative of the lift, dynamic pressure and angle of attack, it will be appreciated that these signals may be obtained alternatively from other types of conventional sensing means or from other known combinations of elements. The difference networks 25, 33, 52, 53 and 64 are conventional and may be designed in accordance with the subtraction circuit techniques disclosed in chapter 3 of volume 21 of the M.I.T. Radiation Laboratory Series published by McGraw-Hill, first edition.

Further, while the invention has been described with respect to aircraft, the principles of the invention are equally adaptable to other navigable craft utilizing lift-producing foils including marine craft having hydro-foils.

While the invention has been described in its preferred embodiment, it is to be understood that the words which have been used are words of description rather than of

What is claimed is:

1. A stall prevention apparatus for navigable craft comprising means for providing a signal representative of the coefficient of lift experienced by said craft, means for providing a signal representative of the angle of attack of said craft, means responsive to said coefficient of lift and angle of attack signals for providing signals representative of the change of the coefficient of lift and the change of angle of attack respectively with a predetermined time interval, and quotient obtaining means responsive to said change of coefficient of lift and change of angle of attack signals for providing a signal representative of the change of coefficient of lift with respect to the change in the angle of attack.

2. Stall prevention apparatus for navigable craft comprising means for providing a signal representative of the lift experienced by said craft, means for providing a signal representative of the dynamic pressure experienced by said craft, means responsive to said lift and dynamic pressure signals for providing a signal representative of the coefficient of lift experienced by said craft, means for providing a signal representative of the angle of attack of said craft, means responsive to said coefficient of lift and angle of attack signals for providing signals representative of the change of coefficient of lift and the change of angle of attack respectively within a predetermined time interval, and quotient obtaining means responsive to said change of coefficient of lift and change of angle of attack signals for providing a signal representative of the change of coefficient of lift with respect to the change in the angle of attack.

3. Apparatus as claimed in claim 2 including indicating means responsive to the signal representative of the change in the coefficient of lift with respect to the change of the angle of attack for providing an indication thereof.

4. Apparatus as claimed in claim 2 including means for controlling the attitude of said craft and means responsive to a function of said signal representative of the change of coefficient of lift with respect to the change in angle of attack for controlling said attitude controlling mechanism in a direction to prevent stall of the craft.

5. A stall prevention system for navigable craft comprising means for providing a signal representative of the lift produced by said craft, means for providing a signal representative of the dynamic pressure experienced by said craft, means responsive to said lift and dynamic pressure signals for providing a signal representative of the coefficient of lift, means for providing a signal representative of the angle of attack of said craft, means responsive to said coefficient of lift and angle of attack signals for providing signals representative of the change in the coefficient of lift and angle of attack over a predetermined time interval, quotient obtaining means responsive to said change in coefficient of lift and change in angle of attack signals for providing a signal representative of the quotient of the change of the coefficient of lift with respect to the change of the angle of attack, and means responsive to said change in angle of attack signal for rendering said system inoperative when said change is below a predetermined value.

6. A system as claimed in claim 5 wherein said means responsive to said coefficient of lift and angle of attack signals for providing signals representative of the change thereof includes a magnetic tape device having write heads responsive to said coefficient of lift and angle of attack signals and read heads for providing signals representative of delayed versions of said coefficient of lift and angle of attack signals, said system further including first summing means responsive to said coefficient of lift and delayed coefficient of lift signals for providing a signal representative of the change in the coefficient of lift with respect to a predetermined time interval, and second summing means responsive to said angle of attack and delayed angle of attack signals for providing a signal representative of the change in angle of attack with respect to said predetermined time interval.

7. A system as claimed in claim 5 including means responsive to said change of coefficient of lift with respect to the change of the angle of attack signal for providing an indication thereof.

8. A system as claimed in claim 5 including means for providing a signal representative of the time rate of change of the coefficient of lift with respect to the change of the angle of attack and means responsive to said rate signal for preventing the craft from experiencing a stall.

9. A system as claimed in claim 5 including means for producing a signal representative of the time rate of change of the coefficient of lift with respect to the change of the angle of attack, craft attitude control means, and means responsive to said rate signal for actuating said attitude control means to prevent said craft from experiencing a stall condition in accordance with the severity of the approaching stall condition.

10. A stall prevention system for aircraft comprising lift sensing means for providing a signal representative of the lift produced by the wing of said aircraft, pressure transducer means for providing a signal representative of the dynamic pressure experienced by said aircraft, means responsive to said lift and dynamic pressure signals for providing a signal representative of the coefficient of lift, angle of attack sensing means for providing a signal representative of the angle of attack of said craft, means responsive to said coefficient of lift and angle of attack signals for providing signals representative of the change in the coefficient of lift and angle of attack over a predetermined time interval, quotient-obtaining means responsive to said change in coefficient of lift and change in angle of attack signals for providing a signal representative of the quotient of the change of the coefficient of lift with respect to the change of the angle of attack, and means responsive to said change in angle of attack signal for rendering said system inoperative when said change is below a predetermined value.

11. A system as claimed in claim 10 including means responsive to said change of coefficient of lift with respect to the change of the angle of attack signal for providing an indication thereof.

12. A system as claimed in claim 10 including means for providing a signal representative of the time rate of change of the coefficient of lift with respect to the change of the angle of attack and means responsive to said rate signal for preventing the aircraft from experiencing a stall.

13. A system as claimed in claim 10 including means for producing a signal representative of the time rate of change of the coefficient of lift with respect to the change of the angle of attack, aircraft attitude control means, and means responsive to said rate signal for actuating said attitude control means to prevent said aircraft from experiencing a stall condition in accordance with the severity of the approaching stall condition.

References Cited in the file of this patent

UNITED STATES PATENTS

| | | |
|---|---|---|
| 2,701,111 | Schuck | Feb. 1, 1955 |
| 2,891,742 | Treffeisen | June 23, 1959 |
| 2,945,375 | Greene et al. | July 19, 1960 |